United States Patent
Kim et al.

(10) Patent No.: US 11,042,780 B2
(45) Date of Patent: Jun. 22, 2021

(54) LEARNING METHOD AND LEARNING DEVICE OF RECURRENT NEURAL NETWORK FOR AUTONOMOUS DRIVING SAFETY CHECK FOR CHANGING DRIVING MODE BETWEEN AUTONOMOUS DRIVING MODE AND MANUAL DRIVING MODE, AND TESTING METHOD AND TESTING DEVICE USING THEM

(71) Applicant: Stradvision, Inc., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

(*) Notice: Subject to any disclaimer, the term of this patent is extended or adjusted under 35 U.S.C. 154(b) by 10 days.

(21) Appl. No.: 16/723,753

(22) Filed: Dec. 20, 2019

(65) Prior Publication Data

US 2020/0242408 A1  Jul. 30, 2020

Related U.S. Application Data

(60) Provisional application No. 62/798,946, filed on Jan. 30, 2019.

(51) Int. Cl.
*G06K 9/00* (2006.01)
*G06K 9/62* (2006.01)
(Continued)

(52) U.S. Cl.
CPC ......... *G06K 9/6257* (2013.01); *G05D 1/0088* (2013.01); *G05D 1/0231* (2013.01);
(Continued)

(58) Field of Classification Search
CPC ............ G06K 9/6257; G06K 9/00791; G06K 9/6231; G06K 9/6262; G05D 1/0088;
(Continued)

(56) References Cited

U.S. PATENT DOCUMENTS 8,818,608 B2    8/2014  Cullinane et al.
9,934,440 B1 *  4/2018  Kim .................... G06K 9/4628
(Continued)

OTHER PUBLICATIONS

Deep Reinforcement Learning framework for Autonomous Driving, Apr. 8, 2017, Cornell University Library, 201 Olin Library Cornell University Ithaca, p. 5 col. 2.
(Continued)

*Primary Examiner* — Gregory M Desire
(74) *Attorney, Agent, or Firm* — Kaplan Breyer Schwarz, LLP

(57) ABSTRACT

A method for learning a recurrent neural network to check an autonomous driving safety to be used for switching a driving mode of an autonomous vehicle is provided. The method includes steps of: a learning device (a) if training images corresponding to a front and a rear cameras of the autonomous vehicle are acquired, inputting each pair of the training images into corresponding CNNs, to concatenate the training images and generate feature maps for training, (b) inputting the feature maps for training into long short-term memory models corresponding to sequences of a
(Continued)

forward RNN, and into those corresponding to the sequences of a backward RNN, to generate updated feature maps for training and inputting feature vectors for training into an attention layer, to generate an autonomous-driving mode value for training, and (c) allowing a loss layer to calculate losses and to learn the long short-term memory models.

22 Claims, 6 Drawing Sheets

(51) Int. Cl.
 *G05D 1/00* (2006.01)
 *G05D 1/02* (2020.01)
 *G06N 3/04* (2006.01)
 *G06N 3/08* (2006.01)

(52) U.S. Cl.
 CPC ....... *G06K 9/00791* (2013.01); *G06K 9/6231* (2013.01); *G06K 9/6262* (2013.01); *G06N 3/0445* (2013.01); *G06N 3/0454* (2013.01); *G06N 3/084* (2013.01); *G05D 1/0214* (2013.01); *G05D 2201/0213* (2013.01)

(58) Field of Classification Search
 CPC ............... G05D 1/0231; G05D 1/0214; G05D 2201/0213; G06N 3/0445; G06N 3/0454; G06N 3/084
 See application file for complete search history.

(56) References Cited

U.S. PATENT DOCUMENTS

| | | | |
|---|---|---|---|
| 10,402,653 B2* | 9/2019 | Min | G06N 3/0454 |
| 10,402,995 B2* | 9/2019 | Kwant | G06T 7/12 |
| 10,593,042 B1* | 3/2020 | Douillard | G06K 9/34 |
| 10,691,133 B1* | 6/2020 | Abeloe | G06N 3/084 |
| 10,908,614 B2* | 2/2021 | Fowe | G06K 9/4619 |
| 10,922,566 B2* | 2/2021 | el Kaliouby | A61B 5/746 |
| 2018/0203457 A1* | 7/2018 | Moosaei | G08G 1/167 |
| 2019/0065944 A1* | 2/2019 | Hotson | G06N 3/084 |
| 2019/0092318 A1* | 3/2019 | Mei | G06K 9/00825 |
| 2019/0096086 A1* | 3/2019 | Xu | G06K 9/00791 |
| 2019/0213426 A1* | 7/2019 | Chen | G06T 7/20 |
| 2020/0134833 A1* | 4/2020 | Biswas | G06K 9/342 |

OTHER PUBLICATIONS

Extended European Search Report issued in EP Patent Application No. 20151660 dated Jun. 18, 2020.
Lee Min Seok et al, Individual Stable Driving Pattern Analysis for Evaluating Driver Readiness at Autonomous Driving Levels 2 and 3, Oct. 17, 2018, International Conference on Information and Communication Technology Convergence (ICTC), Section II.
Rosman et al, Hybrid Control and Learning with Coresets for Autonomous Vehicles, Sep. 24, 2017, IEEE/RSJ International Conference on Intelligent Robots and Systems (IROS), pp. 6894-6901.
Wang et al, Formulation of Deep Reinforcement Learning Architecture Toward Autonomous Driving for On-Ramp Merge, Sep. 7, 2017, Cornell University Library, 201 Olin Library Cornell University Ithaca, Section III.

* cited by examiner

LEARNING METHOD AND LEARNING DEVICE OF RECURRENT NEURAL NETWORK FOR AUTONOMOUS DRIVING SAFETY CHECK FOR CHANGING DRIVING MODE BETWEEN AUTONOMOUS DRIVING MODE AND MANUAL DRIVING MODE, AND TESTING METHOD AND TESTING DEVICE USING THEM

CROSS REFERENCE TO RELATED APPLICATION

This application claims the benefit of priority to U.S. Provisional Patent Application No. 62/798,946, filed on Jan. 30, 2019, the entire contents of which are incorporated herein by reference.

FIELD OF THE DISCLOSURE

The present disclosure relates to a learning method and a device using the same and a testing method and a device using the same for a recurrent neural network to switch between an autonomous driving mode and a manual driving mode; and more particularly, to the methods and the devices for learning and testing the recurrent neural network which checks at least one autonomous driving safety for switching between the autonomous driving mode and the manual driving mode by recognizing a hazardous situation of an autonomous vehicle using integration of pieces of multiple camera information.

BACKGROUND OF THE DISCLOSURE

Autonomous vehicles use various computing systems to aid in transport of passengers from one location to another. Some autonomous vehicles may require some initial input or continuous input from an operator, such as a pilot, driver, or passenger. Other systems, for example, autopilot systems, may be used only when the system has been engaged, which permits the operator to switch from a manual driving mode (where the operator exercises a high degree of control over a movement of the vehicle) to an autonomous driving mode (where the vehicle essentially drives itself).

In particular, U.S. Pat. No. 8,818,608 discloses a method for changing the autonomous driving mode to the manual driving mode under certain conditions.

However, in order to switch a driving mode in a conventional autonomous vehicle, various driving information is required. To this end, various sensors must be installed on the conventional autonomous vehicle, which increases manufacturing cost of the conventional autonomous vehicle.

In addition, in the conventional autonomous vehicle, a large amount of sensor information from the various sensors must be processed in order to change the driving mode, therefore, huge amount of computing resources are required.

SUMMARY OF THE DISCLOSURE

It is an object of the present disclosure to solve all the aforementioned problems.

It is another object of the present disclosure to allow checking of an autonomous driving safety for switching a driving mode without increase in manufacturing cost of an autonomous vehicle.

It is still another object of the present disclosure to minimize the number of sensors capable of acquiring driving information for switching the driving mode of the autonomous vehicle, compared to conventional methods.

It is still yet another object of the present disclosure to allow less computing resources for processing sensor information to acquire the driving information for switching the driving mode of the autonomous vehicle.

In accordance with one aspect of the present disclosure, there is provided a method for learning a recurrent neural network to check an autonomous driving safety to be used for switching a driving mode of an autonomous vehicle, including steps of: (a) if a (1_1)-st training image to a (1_n)-th training image and a (2_1)-st training image to a (2_n)-th training image, which are sequence images respectively corresponding to a front camera for training and a rear camera for training of an autonomous vehicle for training, are acquired, a learning device performing a process of inputting each pair comprised of a (1_k)-th training image and a (2_k)-th training image, wherein an integer k represents sequences starting from n to 1, respectively into a 1-st convolutional neural network to an n-th convolutional neural network corresponding to a sequence of said each pair, to thereby allow a k-th convolutional neural network to concatenate the (1_k)-th training image and the (2_k)-th training image and thus to generate a 1-st feature map for training to an n-th feature map for training by applying convolution operation to a concatenation of the (1_k)-th training image and the (2_k)-th training image; (b) the learning device performing (i) a process of inputting the 1-st feature map for training to the n-th feature map for training respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (i-1) a (1_k)-th long short-term memory model to (i-1-a) generate a (1_k)-th updated feature map for training as a result of updating the k-th feature map for training by referring to both a {1_(k+1)}-th updated feature map for training outputted from a {1_(k+1)}-th long short-term memory model and a k-th feature map for training outputted from a k-th convolutional neural network and (i-1-b) generate a (1_1)-st feature vector for training to a (1_n)-th feature vector for training as a result of applying fully-connected operation to the (1_k)-th updated feature map for training, and (i-2) a (2_k)-th long short-term memory model to (i-2-a) generate a (2_k)-th updated feature map for training as a result of updating the k-th feature map for training by referring to both a {2_(k-1)}-th updated feature map for training outputted from a {2_(k-1)}-th long short-term memory model and the k-th feature map for training outputted from the k-th convolutional neural network and (i-2-b) generate a (2_1)-st feature vector for training to a (2_n)-th feature vector for training as a result of applying fully-connected operation to the (2_k)-th updated feature map for training, and (ii) a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training; and (c) the learning device performing a process of allowing a loss layer to calculate one or more losses by referring to the autonomous-driving mode value for training and its corresponding ground truth, and a process of learning the (1_1)-st long short-term memory model to the (1_n)-th long short-term memory model and the (2_1)-st long short-term memory model to the (2_n)-th long short-term memory model such that the losses are minimized by backpropagation using the losses.

As one example, at the step of (b), the learning device performs a process of allowing the attention layer to (i) concatenate a (1_k)-th feature vector for training and a (2_k)-th feature vector for training, to thereby generate a 1-st concatenated feature vector for training to an n-th concatenated feature vector for training and (ii) weight-average the 1-st concatenated feature vector for training to the n-th concatenated feature vector for training, to thereby generate the autonomous-driving mode value for training.

As one example, at the step of (a), the learning device performs a process of allowing the 1-st convolutional neural network to the n-th convolutional neural network to (i) respectively concatenate the (1_k)-th training image and the (2_k)-th training image, to thereby generate a k-th concatenated training image and (ii) apply convolution operation to the k-th concatenated training image, to thereby generate the 1-st feature map for training to the n-th feature map for training.

As one example, at the step of (b), the learning device performs (i) a process of allowing the (1_k)-th long short-term memory model to generate the (1_1)-st feature vector for training to the (1_n)-th feature vector for training by referring to the {1_(k+1)}-th updated feature map for training and the (1_k)-th feature map for training, wherein the (1_1)-st feature vector for training to the (1_n)-th feature vector for training correspond to features to be used for determining whether driving environment for training represents a hazardous situation by referring to said pair of the (1_k)-th training image and the (2_k)-th training image, and (ii) a process of allowing the (2_k)-th long short-term memory model to generate the (2_1)-st feature vector for training to the (2_n)-th feature vector for training by referring to the {2_(k−1)}-th updated feature map for training and the (2_k)-th feature map for training, wherein the (2_1)-st feature vector for training to the (2_n)-th feature vector for training correspond to features to be used for determining whether the driving environment for training represents the hazardous situation by referring to said pair of the (1_k)-th training image and the (2_k)-th training image.

As one example, at the step of (c), the learning device performs a process of allowing the loss layer to normalize the autonomous-driving mode value for training by using a softmax algorithm, and a process of calculating the losses by referring to the normalized autonomous-driving mode value for training and the ground truth.

As one example, the (1_1)-st training image to the (1_n)-th training image and the (2_1)-st training image to the (2_n)-th training image are generated by (i) (i−1) a process of sampling a video taken by the front camera for training of the autonomous vehicle for training per preset time intervals to thereby extract 1-st sequence images and (i−2) a process of labeling each of the extracted 1-st sequence images as to whether autonomous driving is possible, and (ii) (ii−1) a process of sampling a video taken by the rear camera for training of the autonomous vehicle for training per the preset time intervals to extract 2-nd sequence images and (ii−2) a process of labeling each of the extracted 2-nd sequence images as to whether the autonomous driving is possible.

As one example, at the step of (c), the ground truth is acquired from a 1-st next sequence image corresponding to a next sequence of the (1_1)-st training image to the (1_n)-th training image and a 2-nd next sequence image corresponding to the next sequence of the (2_1)-st training image to the (2_n)-th training image, among the sequence images.

In accordance with another aspect of the present disclosure, there is provided a method for testing a recurrent neural network to check an autonomous driving safety to be used for switching a driving mode of an autonomous vehicle, including steps of: (a) on condition that a learning device has performed, if a (1_1)-st training image to a (1_n)-th training image and a (2_1)-st training image to a (2_n)-th training image, which are sequence images respectively corresponding to a front camera for training and a rear camera for training of an autonomous vehicle for training, are acquired, (i) a process of inputting each pair comprised of a (1_k)-th training image and a (2_k)-th training image, wherein an integer k represents sequences starting from n to 1, respectively into a 1-st convolutional neural network to an n-th convolutional neural network corresponding to a sequence of said each pair, to thereby allow a k-th convolutional neural network to concatenate the (1_k)-th training image and the (2_k)-th training image and thus to generate a 1-st feature map for training to an n-th feature map for training by applying convolution operation to a concatenation of the (1_k)-th training image and the (2_k)-th training image, (ii) a process of inputting the 1-st feature map for training to the n-th feature map for training respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (ii−1) a (1_k)-th long short-term memory model to (ii−1-a) generate a (1_k)-th updated feature map for training as a result of updating the k-th feature map for training by referring to both a {1_(k+1)}-th updated feature map for training outputted from a {1_(k+1)}-th long short-term memory model and a k-th feature map for training outputted from a k-th convolutional neural network and (ii−1-b) generate a (1_1)-st feature vector for training to a (1_n)-th feature vector for training as a result of applying fully-connected operation to the (1_k)-th updated feature map for training, and (ii−2) a (2_k)-th long short-term memory model to (ii−2-a) generate a (2_k)-th updated feature map for training as a result of updating the k-th feature map for training by referring to both a {2_(k−1)}-th updated feature map for training outputted from a {2_(k−1)}-th long short-term memory model and the k-th feature map for training outputted from the k-th convolutional neural network and (ii−2-b) generate a (2_1)-st feature vector for training to a (2_n)-th feature vector for training as a result of applying fully-connected operation to the (2_k)-th updated feature map for training, (iii) a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training and (iv) a process of allowing a loss layer to calculate one or more losses by referring to the autonomous-driving mode value for training and its corresponding ground truth and a process of learning the (1_1)-st long short-term memory model to the (1_n)-th long short-term memory model and the (2_1)-st long short-term memory model to the (2_n)-th long short-term memory model such that the losses are minimized by backpropagation using the losses, if a front video for testing and a rear video for testing of an autonomous vehicle for testing are acquired respectively from a front camera for testing and a rear camera for testing of the autonomous vehicle for testing in operation, a testing device performing a process of inputting a 1-st test image corresponding to a current frame of the front video for testing and a 2-nd test image corresponding to a current frame of the rear video for testing into the 1-st convolutional neural network, to thereby allow the 1-st convolutional neural network to generate a 1-st feature map for testing by applying convolution operation to a concatenation of the 1-st test image and the 2-nd test image; and (b) the testing device performing (i) a process of inputting the 1-st feature map for testing to the n-th feature map for testing respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (i–1) a (1_k)-th long short-term memory model to (i–1-a) generate a (1_k)-th updated feature map for testing as a result of updating the k-th feature map for testing by referring to both a {1_(k+1)}-th updated feature map for testing outputted from a {1_(k+1)}-th long short-term memory model and a k-th feature map for testing outputted from a k-th convolutional neural network and (i–1-b) generate a (1_1)-st feature vector for testing to a (1_n)-th feature vector for testing as a result of applying fully-connected operation to the (1_k)-th updated feature map for testing, and (i–2) a (2_k)-th long short-term memory model to (i–2-a) generate a (2_k)-th updated feature map for testing as a result of updating the k-th feature map for testing by referring to both a {2_(k–1)}-th updated feature map for testing outputted from a {2_(k–1)}-th long short-term memory model and the k-th feature map for testing outputted from the k-th convolutional neural network and (i–2-b) generate a (2_1)-st feature vector for testing to a (2_n)-th feature vector for testing as a result of applying fully-connected operation to the (2_k)-th updated feature map for testing, and (ii) a process of inputting the (1_1)-st feature vector for testing to the (1_n)-th feature vector for testing and the (2_1)-st feature vector for testing to the (2_n)-th feature vector for testing into an attention layer, to thereby allow the attention layer to generate an autonomous-driving mode value for testing in every sequence of the (1_1)-st test image to the (1_n)-th test image and the (2_1)-st test image to the (2_n)-th test image by referring to the (1_1)-st feature vector for testing to the (1_n)-th feature vector for testing and the (2_1)-st feature vector for testing to the (2_n)-th feature vector for testing.

As one example, at the step of (b), the testing device performs a process of allowing the attention layer to (i) concatenate a (1_k)-th feature vector for testing and a (2_k)-th feature vector for testing, to thereby generate a 1-st concatenated feature vector for testing to an n-th concatenated feature vector for testing and (ii) weight-average the 1-st concatenated feature vector for testing to the n-th concatenated feature vector for testing, to thereby generate the autonomous-driving mode value for testing.

As one example, at the step of (a), the testing device performs a process of allowing the 1-st convolutional neural network to (i) concatenate the 1-st test image and the 2-nd test image, to thereby generate a 1-st concatenated test image and (ii) apply convolution operation to the 1-st concatenated test image, to thereby generate the 1-st feature map for testing.

As one example, at the step of (b), the testing device performs (i) a process of allowing the (1_1)-st long short-term memory model to generate the (1_1)-st feature vector for testing by referring to the (1_2)-nd updated feature map for testing and the 1-st feature map for testing, wherein the (1_1)-st feature vector for testing corresponds to features to be used for determining whether driving environment for testing represents a hazardous situation by referring to a pair of the 1-st test image and the 2-nd test image, (ii) a process of allowing the (2_1)-st long short-term memory model to generate the (2_1)-st feature vector for testing by referring to the (2_1)-st updated feature map for testing, wherein the (2_1)-st feature vector for testing corresponds to features to be used for determining whether the driving environment for testing represents the hazardous situation by referring to said pair of the 1-st test image and the 2-nd test image and (iii) a process of allowing the (2_m)-th long short-term memory model to generate the (2_2)-nd feature vector for testing to the (2_n)-th feature vector for testing by referring to the {2_(m_1)}-th updated feature map for testing and an m-th feature map for testing, wherein the (2_2)-nd feature vector for testing to the (2_n)-th feature vector for testing correspond to features to be used for determining whether the driving environment for testing represents the hazardous situation by referring to said pair of the 1-st test image and the 2-nd test image.

In accordance with still another aspect of the present disclosure, there is provided a learning device for learning a recurrent neural network to check an autonomous driving safety to be used for switching a driving mode of an autonomous vehicle, including: at least one memory that stores instructions; and at least one processor configured to execute the instructions to perform or support another device to perform: (I) if a (1_1)-st training image to a (1_n)-th training image and a (2_1)-st training image to a (2_n)-th training image, which are sequence images respectively corresponding to a front camera for training and a rear camera for training of an autonomous vehicle for training, are acquired, a process of inputting each pair comprised of a (1_k)-th training image and a (2_k)-th training image, wherein an integer k represents sequences starting from n to 1, respectively into a 1-st convolutional neural network to an n-th convolutional neural network corresponding to a sequence of said each pair, to thereby allow a k-th convolutional neural network to concatenate the (1_k)-th training image and the (2_k)-th training image and thus to generate a 1-st feature map for training to an n-th feature map for training by applying convolution operation to a concatenation of the (1_k)-th training image and the (2_k)-th training image, (II) (i) a process of inputting the 1-st feature map for training to the n-th feature map for training respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (i–1) a (1_k)-th long short-term memory model to (i–1-a) generate a (1_k)-th updated feature map for training as a result of updating the k-th feature map for training by referring to both a {1_(k+1)}-th updated feature map for training outputted from a {1_(k+1)}-th long short-term memory model and a k-th feature map for training outputted from a k-th convolutional neural network and (i-1-b) generate a (1_1)-st feature vector for training to a (1_n)-th feature vector for training as a result of applying fully-connected operation to the (1_k)-th updated feature map for training, and (i-2) a (2_k)-th long short-term memory model to (i-2-a) generate a (2_k)-th updated feature map for training as a result of updating the k-th feature map for training by referring to both a {2_(k-1)}-th updated feature map for training outputted from a {2_(k-1)}-th long short-term memory model and the k-th feature map for training outputted from the k-th convolutional neural network and (i-2-b) generate a (2_1)-st feature vector for training to a (2_n)-th feature vector for training as a result of applying fully-connected operation to the (2_k)-th updated feature map for training, and (ii) a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training, and (III) a process of allowing a loss layer to calculate one or more losses by referring to the autonomous-driving mode value for training and its corresponding ground truth, and a process of learning the (1_1)-st long short-term memory model to the (1_n)-th long short-term memory model and the (2_1)-st long short-term memory model to the (2_n)-th long short-term memory model such that the losses are minimized by backpropagation using the losses.

As one example, at the process of (II), the processor performs a process of allowing the attention layer to (i) concatenate a (1_k)-th feature vector for training and a (2_k)-th feature vector for training, to thereby generate a 1-st concatenated feature vector for training to an n-th concatenated feature vector for training and (ii) weight-average the 1-st concatenated feature vector for training to the n-th concatenated feature vector for training, to thereby generate the autonomous-driving mode value for training.

As one example, at the process of (I), the processor performs a process of allowing the 1-st convolutional neural network to the n-th convolutional neural network to (i) respectively concatenate the (1_k)-th training image and the (2_k)-th training image, to thereby generate a k-th concatenated training image and (ii) apply convolution operation to the k-th concatenated training image, to thereby generate the 1-st feature map for training to the n-th feature map for training.

As one example, at the process of (II), the processor performs (i) a process of allowing the (1_k)-th long short-term memory model to generate the (1_1)-st feature vector for training to the (1_n)-th feature vector for training by referring to the {1_(k+1)}-th updated feature map for training and the (1_k)-th feature map for training, wherein the (1_1)-st feature vector for training to the (1_n)-th feature vector for training correspond to features to be used for determining whether driving environment for training represents a hazardous situation by referring to said pair of the (1_k)-th training image and the (2_k)-th training image, and (ii) a process of allowing the (2_k)-th long short-term memory model to generate the (2_1)-st feature vector for training to the (2_n)-th feature vector for training by referring to the {2_(k-1)}-th updated feature map for training and the (2_k)-th feature map for training, wherein the (2_1)-st feature vector for training to the (2_n)-th feature vector for training correspond to features to be used for determining whether the driving environment for training represents the hazardous situation by referring to said pair of the (1_k)-th training image and the (2_k)-th training image.

As one example, at the process of (III), the processor performs a process of allowing the loss layer to normalize the autonomous-driving mode value for training by using a softmax algorithm, and a process of calculating the losses by referring to the normalized autonomous-driving mode value for training and the ground truth.

As one example, the (1_1)-st training image to the (1_n)-th training image and the (2_1)-st training image to the (2_n)-th training image are generated by (i) (i-1) a process of sampling a video taken by the front camera for training of the autonomous vehicle for training per preset time intervals to thereby extract 1-st sequence images and (i-2) a process of labeling each of the extracted 1-st sequence images as to whether autonomous driving is possible, and (ii) (ii-1) a process of sampling a video taken by the rear camera for training of the autonomous vehicle for training per the preset time intervals to extract 2-nd sequence images and (ii-2) a process of labeling each of the extracted 2-nd sequence images as to whether the autonomous driving is possible.

As one example, at the process of (III), the ground truth is acquired from a 1-st next sequence image corresponding to a next sequence of the (1_1)-st training image to the (1_n)-th training image and a 2-nd next sequence image corresponding to the next sequence of the (2_1)-st training image to the (2_n)-th training image, among the sequence images.

In accordance with still yet another aspect of the present disclosure, there is provided a testing device for testing a recurrent neural network to check an autonomous driving safety to be used for switching a driving mode of an autonomous vehicle, including: at least one memory that stores instructions; and at least one processor configured to execute the instructions to perform or support another device to perform: (I) on condition that a learning device has performed, if a (1_1)-st training image to a (1_n)-th training image and a (2_1)-st training image to a (2_n)-th training image, which are sequence images respectively corresponding to a front camera for training and a rear camera for training of an autonomous vehicle for training, are acquired, (i) a process of inputting each pair comprised of a (1_k)-th training image and a (2_k)-th training image, wherein an integer k represents sequences starting from n to 1, respectively into a 1-st convolutional neural network to an n-th convolutional neural network corresponding to a sequence of said each pair, to thereby allow a k-th convolutional neural network to concatenate the (1_k)-th training image and the (2_k)-th training image and thus to generate a 1-st feature map for training to an n-th feature map for training by applying convolution operation to a concatenation of the (1_k)-th training image and the (2_k)-th training image, (ii) a process of inputting the 1-st feature map for training to the n-th feature map for training respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (ii-1) a (1_k)-th long short-term memory model to (ii-1-a) generate a (1_k)-th updated feature map for training as a result of updating the k-th feature map for training by referring to both a {1_(k+1)}-th updated feature map for training outputted from a {1_(k+1)}-th long short-term memory model and a k-th feature map for training outputted from a k-th convolutional neural network and (ii-1-b) generate a (1_1)-st feature vector for training to a (1_n)-th feature vector for training as a result of applying fully-connected operation to the (1_k)-th updated feature map for training, and (ii-2) a (2_k)-th long short-term memory model to (ii-2-a) generate a (2_k)-th updated feature map for training as a result of updating the k-th feature map for training by referring to both a {2_(k-1)}-th updated feature map for training outputted from a {2_(k-1)}-th long short-term memory model and the k-th feature map for training outputted from the k-th convolutional neural network and (ii-2-b) generate a (2_1)-st feature vector for training to a (2_n)-th feature vector for training as a result of applying fully-connected operation to the (2_k)-th updated feature map for training, (iii) a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training and (iv) a process of allowing a loss layer to calculate one or more losses by referring to the autonomous-driving mode value for training and its corresponding ground truth and a process of learning the (1_1)-st long short-term memory model to the (1_n)-th long short-term memory model and the (2_1)-st long short-term memory model to the (2_n)-th long short-term memory model such that the losses are minimized by backpropagation using the losses, if a front video for testing and a rear video for testing of an autonomous vehicle for testing are acquired respectively from a front camera for testing and a rear camera for testing of the autonomous vehicle for testing in operation, a process of inputting a 1-st test image corresponding to a current frame of the front video for testing and a 2-nd test image corresponding to a current frame of the rear video for testing into the 1-st convolutional neural network, to thereby allow the 1-st convolutional neural network to generate a 1-st feature map for testing by applying convolution operation to a concatenation of the 1-st test image and the 2-nd test image, and (II) (i) a process of inputting the 1-st feature map for testing to the n-th feature map for testing respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (i-1) a (1_k)-th long short-term memory model to (i-1-a) generate a (1_k)-th updated feature map for testing as a result of updating the k-th feature map for testing by referring to both a {1_(k+1)}-th updated feature map for testing outputted from a {1_(k+1)}-th long short-term memory model and a k-th feature map for testing outputted from a k-th convolutional neural network and (i-1-b) generate a (1_1)-st feature vector for testing to a (1_n)-th feature vector for testing as a result of applying fully-connected operation to the (1_k)-th updated feature map for testing, and (i-2) a (2_k)-th long short-term memory model to (i-2-a) generate a (2_k)-th updated feature map for testing as a result of updating the k-th feature map for testing by referring to both a {2_(k-1)}-th updated feature map for testing outputted from a {2_(k-1)}-th long short-term memory model and the k-th feature map for testing outputted from the k-th convolutional neural network and (i-2-b) generate a (2_1)-st feature vector for testing to a (2_n)-th feature vector for testing as a result of applying fully-connected operation to the (2_k)-th updated feature map for testing, and (ii) a process of inputting the (1_1)-st feature vector for testing to the (1_n)-th feature vector for testing and the (2_1)-st feature vector for testing to the (2_n)-th feature vector for testing into an attention layer, to thereby allow the attention layer to generate an autonomous-driving mode value for testing in every sequence of the (1_1)-st test image to the (1_n)-th test image and the (2_1)-st test image to the (2_n)-th test image by referring to the (1_1)-st feature vector for testing to the (1_n)-th feature vector for testing and the (2_1)-st feature vector for testing to the (2_n)-th feature vector for testing.

As one example, at the process of (II), the processor performs a process of allowing the attention layer to (i) concatenate a (1_k)-th feature vector for testing and a (2_k)-th feature vector for testing, to thereby generate a 1-st concatenated feature vector for testing to an n-th concatenated feature vector for testing and (ii) weight-average the 1-st concatenated feature vector for testing to the n-th concatenated feature vector for testing, to thereby generate the autonomous-driving mode value for testing.

As one example, at the process of (I), the processor performs a process of allowing the 1-st convolutional neural network to (i) concatenate the 1-st test image and the 2-nd test image, to thereby generate a 1-st concatenated test image and (ii) apply convolution operation to the 1-st concatenated test image, to thereby generate the 1-st feature map for testing.

As one example, at the process of (II), the processor performs (i) a process of allowing the (1_1)-st long short-term memory model to generate the (1_1)-st feature vector for testing by referring to the (1_2)-nd updated feature map for testing and the 1-st feature map for testing, wherein the (1_1)-st feature vector for testing corresponds to features to be used for determining whether driving environment for testing represents a hazardous situation by referring to a pair of the 1-st test image and the 2-nd test image, (ii) a process of allowing the (2_1)-st long short-term memory model to generate the (2_1)-st feature vector for testing by referring to the (2_1)-st updated feature map for testing, wherein the (2_1)-st feature vector for testing corresponds to features to be used for determining whether the driving environment for testing represents the hazardous situation by referring to said pair of the 1-st test image and the 2-nd test image and (iii) a process of allowing the (2_m)-th long short-term memory model to generate the (2_2)-nd feature vector for testing to the (2_n)-th feature vector for testing by referring to the {2_(m_1)}-th updated feature map for testing and an m-th feature map for testing, wherein the (2_2)-nd feature vector for testing to the (2_n)-th feature vector for testing correspond to features to be used for determining whether the driving environment for testing represents the hazardous situation by referring to said pair of the 1-st test image and the 2-nd test image.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
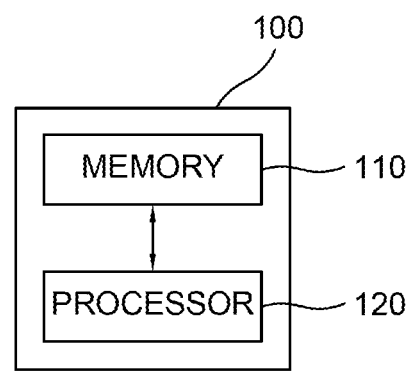
FIG. 1 is a drawing schematically illustrating a learning device for learning a recurrent neural network used for checking an autonomous driving safety to switch between an autonomous driving mode and a manual driving mode in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating a learning device for learning a recurrent neural network used for checking an autonomous driving safety to switch between an autonomous driving mode and a manual driving mode in accordance with one example embodiment of the present disclosure. By referring to FIG. 1, the learning device 100 may include a memory 110 for storing instructions to learn the recurrent neural network used for checking the autonomous driving safety to switch between the autonomous driving mode and the manual driving mode, and a processor 120 for performing processes corresponding to the instructions in the memory 110 to learn the recurrent neural network used for checking the autonomous driving safety to switch between the autonomous driving mode and the manual driving mode.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Below is a description, by referring to FIG. 2, of a learning method for the recurrent neural network used for checking the autonomous driving safety to switch between the autonomous driving mode and the manual driving mode by using the learning device 100 in accordance with one example embodiment of the present disclosure.

First, the learning device 100 may acquire or support another device to acquire training data including sequence images for training corresponding to at least one front camera for training and at least one rear camera for training on an autonomous vehicle for training. Throughout the present disclosure, a "sequence" or "sequences" represents a "sequence in time" or "sequences in time", if used as a single noun without any following nouns. That is, the "sequence" used in "sequence images", etc. may not represent any temporal conception.

Figure 3:
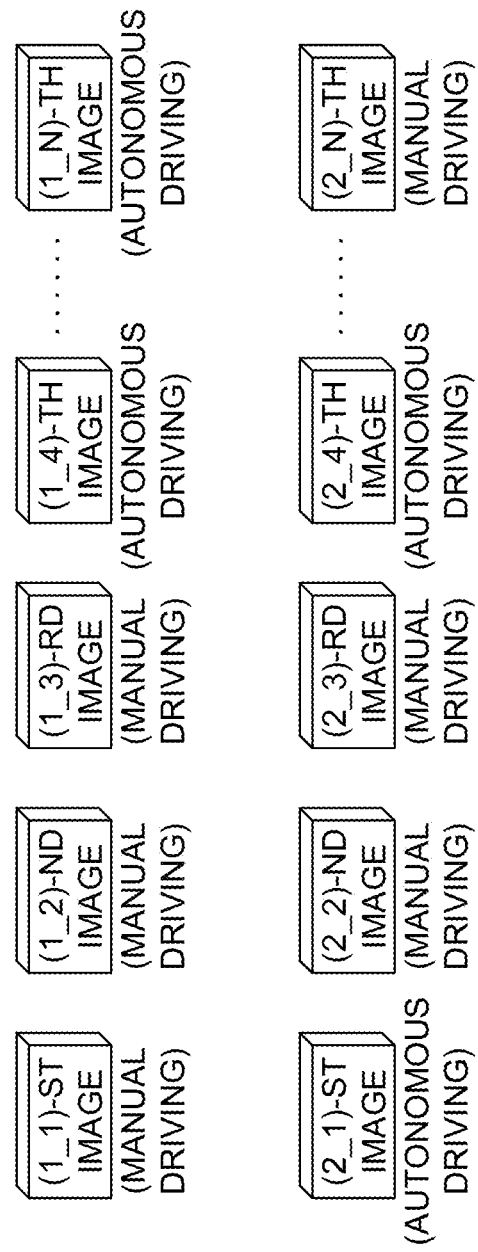
FIG. 3 is a drawing schematically illustrating a process of generating training data for learning the recurrent neural network used for checking the autonomous driving safety to switch between the autonomous driving mode and the manual driving mode in accordance with one example embodiment of the present disclosure.

Herein, by referring to FIG. 3, the training data may include a (1_1)-st training image to a (1_n)-th training image which are the sequence images for training corresponding to the front camera for training on the autonomous vehicle for training, and a (2_1)-st training image to a (2_n)-th training image which are the sequence images for training corresponding to the rear camera for training on the autonomous vehicle for training. Herein, an integer n may represent sequences starting from n to 1.

As one example, to generate the training data, a video taken by the front camera for training on the autonomous vehicle for training may be sampled at preset time intervals, e.g., an image per second, to thereby generate the sequence images for training, and each of the sequence images for training may be labeled as to whether autonomous driving is possible, to thereby generate the (1_1)-st image to the (1_n)-th image. And, a video taken by the rear camera for training on the autonomous vehicle for training may be sampled at the preset time intervals, to thereby generate the sequence images for training, and each of the sequence images for training may be labeled as to whether the autonomous driving is possible, to thereby generate the (2_1)-st image to the (2_n)-th image. And, supposing that k is an integer larger than 0 and equal to or less than n, at least one piece of the training data including each pair comprised of a (1_k)-th image and a (2_k)-th image corresponding to the sequences may be generated. And, the enough training data required for learning may be generated by the process above.

Herein, the number of the pairs of the (1_k)-th image and the (2_k)-th image included in the training data may be set as corresponding to the number of an LSTM (Long Short-Term Memory network) in the recurrent neural network.

Meanwhile, a situation where the autonomous driving is impossible may be a driving environment where the autonomous vehicle may malfunction or crash if kept on the autonomous driving mode, for example, the driving environment where detection of information required for the autonomous driving is difficult like traveling in a tunnel, heavy snow, heavy rain, low illumination, dust on a camera lens, etc. and a dangerous situation like an accident on a road, approach of a speeding vehicle, a nearby vehicle showing aberrant behavior, etc. But the scope of the present disclosure is not limited thereto.

Therefore, the sequence images corresponding to a situation where the autonomous driving is possible and the sequence images corresponding to a situation where the autonomous driving is impossible may be collected to generate the training data.

Then, the learning device 100 may input each pair of the (1_k)-th training image and the (2_k)-th training image in the training data into a 1-st CNN (Convolutional Neural Network) to an n-th CNN each of which corresponds to each of the sequences, and may instruct a k-th CNN assuming that said k varies from 1 to n, i.e., each of the 1-st CNN to the n-th CNN, to concatenate the (1_k)-th training image and the (2_k)-th training image in the pairs corresponding to its sequence and thus to generate a 1-st feature map for training to an n-th feature map for training by applying convolution operation to a concatenation of the (1_k)-th training image and the (2_k)-th training image. Herein, the learning device 100 may perform a process of allowing each of the 1-st CNN to the n-th CNN to (i) respectively concatenate the (1_k)-th training image and the (2_k)-th training image, to thereby generate a k-th concatenated training image and (ii) apply convolution operation to the k-th concatenated training image, to thereby generate the 1-st feature map for training to the n-th feature map for training. That is, the 1-st CNN to the n-th CNN may respectively fuse the multiple camera information into a single piece of information. Herein, the 1-st CNN to the n-th CNN may have been learned beforehand.

Next, the learning device 100 may perform a process of inputting the 1-st feature map for training to the n-th feature map for training respectively into a (1_1)-st long short-term memory model to a (1_n)-th long short-term memory model corresponding to each of the sequences of a forward recurrent neural network, to thereby allow a (1_k)-th long short-term memory model to (i) generate a (1_k)-th updated feature map for training as a result of updating the k-th feature map for training by referring to both (i−1) a {1_(k+1)}-th updated feature map for training outputted from a {1_(k+1)}-th long short-term memory model and (i−2) a k-th feature map for training outputted from a k-th convolutional neural network and (ii) generate a (1_1)-st feature vector for training to a (1_n)-th feature vector for training as a result of applying fully-connected operation to the (1_k)-th updated feature map for training.

That is, the learning device 100 may perform a process of allowing the (1_k)-th long short-term memory model to generate the (1_1)-st feature vector for training to the (1_n)-th feature vector for training by referring to the {1_(k+1)}-th updated feature map for training and the (1_k)-th feature map for training, where the (1_1)-st feature vector for training to the (1_n)-th feature vector for training correspond to features to be used for determining whether driving environment for training represents a hazardous situation by referring to said pair of the (1_k)-th training image and the (2_k)-th training image.

Also, the learning device 100 may perform a process of inputting the 1-st feature map for training to the n-th feature map for training respectively into the (2_1)-st long short-term memory model to the (2_n)-th long short-term memory model corresponding to each of the sequences of a backward recurrent neural network, to thereby allow a (2_k)-th long short-term memory model to (i) generate a (2_k)-th updated feature map for training as a result of updating the k-th feature map for training by referring to both (i–1) a {2_(k–1)}-th updated feature map for training outputted from a {2_(k–1)}-th long short-term memory model and (i–2) the k-th feature map for training outputted from the k-th convolutional neural network and (ii) generate a (2_1)-st feature vector for training to a (2_n)-th feature vector for training as a result of applying fully-connected operation to the (2_k)-th updated feature map for training.

That is, the learning device 100 may perform a process of allowing the (2_k)-th long short-term memory model to generate the (2_1)-th feature vector for training to the (2_n)-th feature vector for training by referring to the {2_(k–1)}-th updated feature map for training and the (2_k)-th feature map for training, where the (2_1)-st feature vector for training to the (2_n)-th feature vector for training correspond to features to be used for determining whether the driving environment for training represents the hazardous situation by referring to said pair of the (1_k)-th training image and the (2_k)-th training image.

Next, the learning device 100 may perform a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training.

That is, the learning device 100 may concatenate feature vectors for training, representing whether the driving environment for training is suitable for the autonomous driving, respectively outputted from a (1_k)-th LSTM and a (2_k)-th LSTM, may weighted-average a concatenation of the feature vectors for training, and may output the autonomous-driving mode value for training representing whether the autonomous driving of the autonomous vehicle for training is possible at a current point of time by referring to the driving information, during a certain time period, on each pair of the (1_1)-st training image to the (1_n)-th training image and the (2_1)-st training image to the (2_n)-th training image.

Next, the learning device 100 may instruct at least one loss layer to calculate one or more losses by referring to (i) the autonomous-driving mode value for training on whether the autonomous driving is possible outputted from the attention layer and (ii) its corresponding ground truth, to thereby learn at least part of one or more parameters of the (2_1)-st LSTM to the (2_n)-th LSTM of the backward RNN and the (1_1)-st LSTM to the (1_n)-th LSTM of the forward RNN, by backpropagation using the losses such that the losses are minimized.

Herein, the learning device 100 may perform a process of allowing the loss layer to normalize the autonomous-driving mode value for training, which is outputted from the attention layer, by using a softmax algorithm, and a process of calculating the losses by referring to the normalized autonomous-driving mode value for training and its corresponding ground truth. And, the ground truth corresponding to the autonomous-driving mode value for training may be acquired from a 1-st next sequence image corresponding to a next sequence of the (1_1)-st training image to the (1_n)-th training image and a 2-nd next sequence image corresponding to the next sequence of the (2_1)-st training image to the (2_n)-th training image, among the sequence images.

Figure 4:
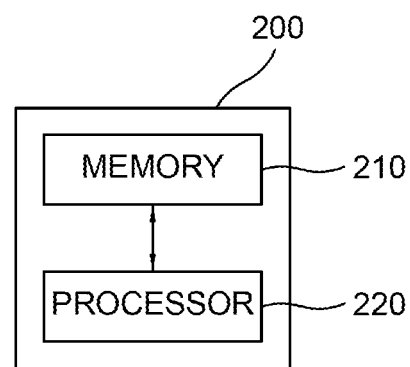
FIG. 4 is a drawing schematically illustrating a testing device for testing the recurrent neural network used for checking the autonomous driving safety to switch between the autonomous driving mode and the manual driving mode in accordance with one example embodiment of the present disclosure.

FIG. 4 is a drawing schematically illustrating a testing device for testing a recurrent neural network used for checking the autonomous driving safety to switch between the autonomous driving mode and the manual driving mode in accordance with one example embodiment of the present disclosure. By referring to FIG. 4, the testing device 200 may include a memory 210 for storing instructions to test the recurrent neural network used for checking the autonomous driving safety to switch between the autonomous driving mode and the manual driving mode, and a processor 220 for performing processes corresponding to the instructions in the memory 210 to test the recurrent neural network used for checking the autonomous driving safety to switch between the autonomous driving mode and the manual driving mode.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Below is a description, by referring to FIGS. 5 and 6, of the testing method for the recurrent neural network used for checking the autonomous driving safety to switch between the autonomous driving mode and the manual driving mode by using the testing device 200 in accordance with one example embodiment of the present disclosure.

Figure 2:
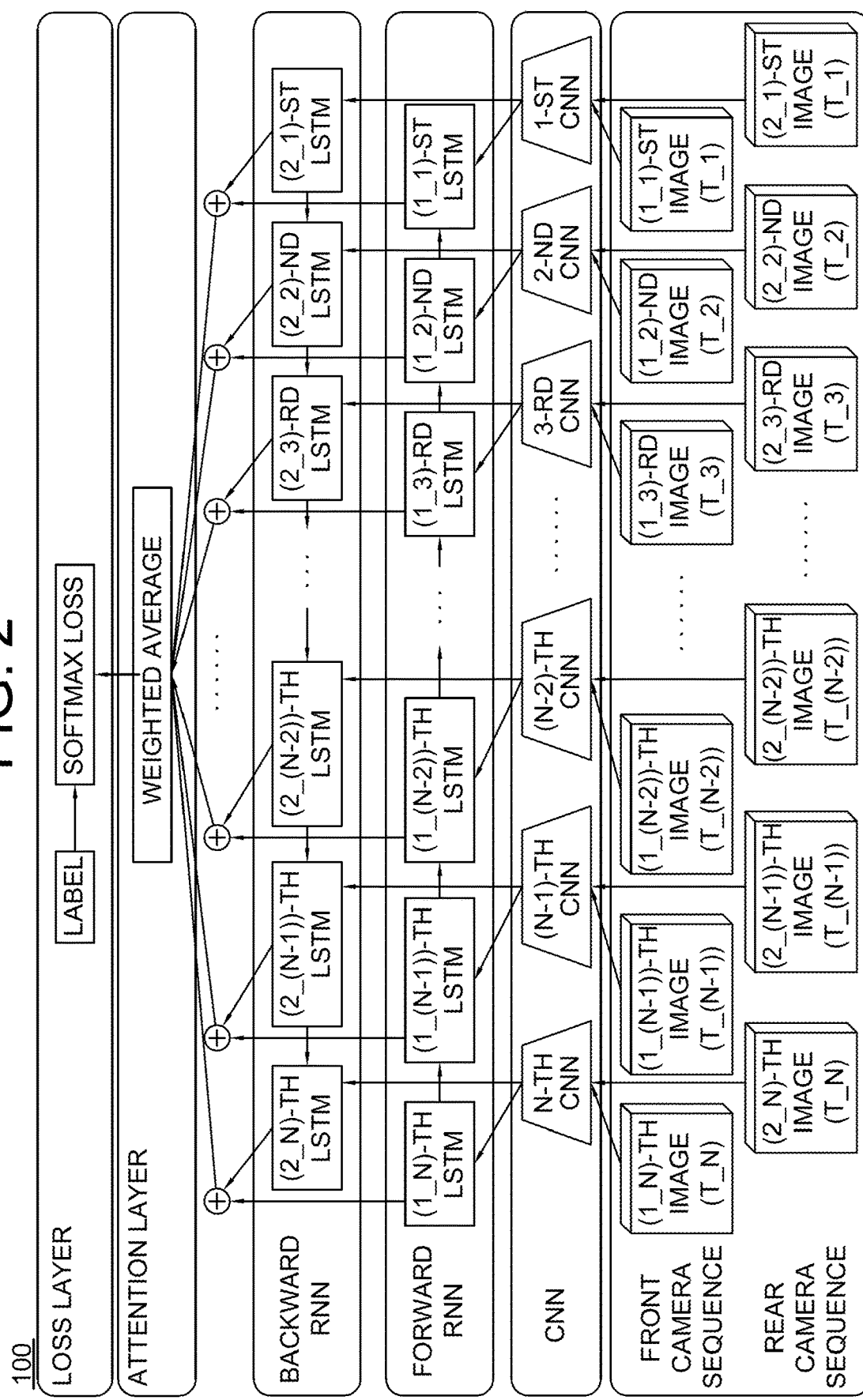
FIG. 2 is a drawing schematically illustrating a learning method for learning the recurrent neural network used for checking the autonomous driving safety to switch between the autonomous driving mode and the manual driving mode in accordance with one example embodiment of the present disclosure.
Figure 5:
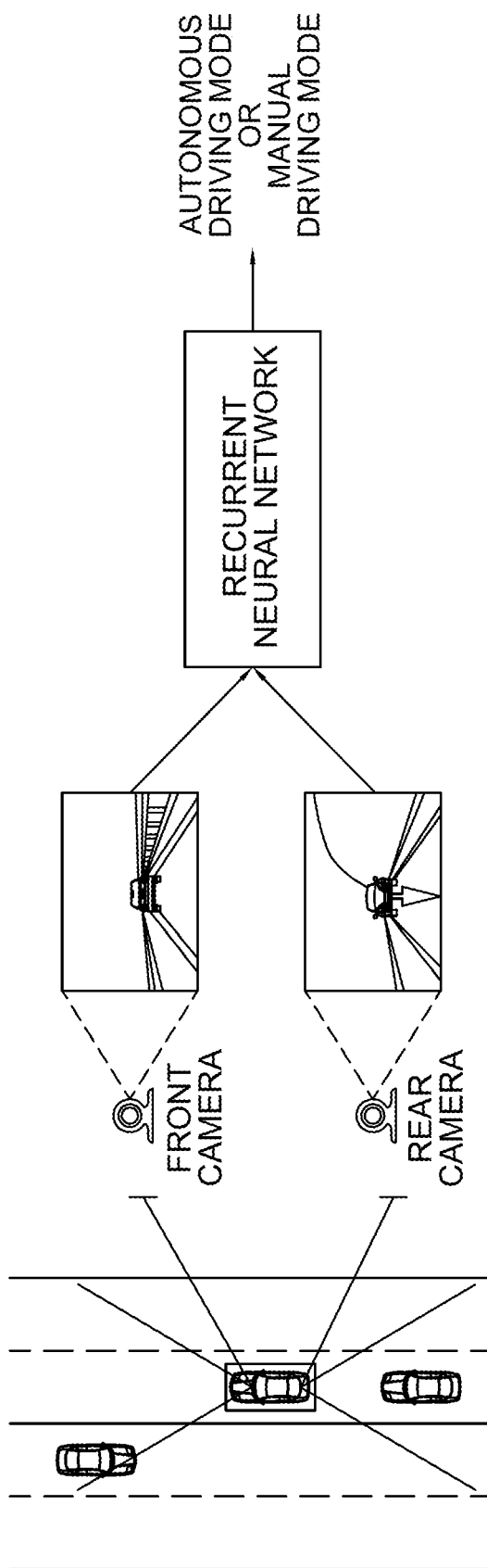
FIG. 5 is a drawing schematically illustrating a driving status of an autonomous vehicle, to which the recurrent neural network used for checking the autonomous driving safety to switch between the autonomous driving mode and the manual driving mode is applied, in accordance with one example embodiment of the present disclosure.

By referring to FIG. 5, the recurrent neural network to be used for checking the autonomous driving safety to switch between the autonomous driving mode and the manual driving mode may have been learned by the learning method described by referring to FIG. 2.

That is, if the (1_1)-st training image to the (1_n)-th training image and the (2_1)-st training image to the (2_n)-th training image, which are the sequence images respectively corresponding to the front camera for training and the rear camera for training of the autonomous vehicle for training, have been acquired, the learning device may have performed a process of inputting each pair comprised of a (1_k)-th training image and a (2_k)-th training image respectively into the 1-st CNN to the n-th CNN corresponding to a sequence of said each pair, to thereby allow a k-th CNN to concatenate the (1_k)-th training image and the (2_k)-th training image and thus to generate the 1-st feature map for training to the n-th feature map for training by applying convolution operation to a concatenation of the (1_k)-th training image and the (2_k)-th training image. And, the learning device may have performed a process of inputting the 1-st feature map for training to the n-th feature map for training respectively into the (1_1)-st long short-term memory model to the (1_n)-th long short-term memory model corresponding to each of the sequences of the forward recurrent neural network, and respectively into the (2_1)-st long short-term memory model to the (2_n)-th long short-term memory model corresponding to each of the sequences of the backward recurrent neural network, to thereby allow (i) a (1_k)-th long short-term memory model to (i–1) generate the (1_k)-th updated feature map for training as a result of updating the k-th feature map for training by referring to both a {1_(k+1)}-th updated feature map for training outputted from a {1_(k+1)}-th long short-term memory model and the (1_k)-th feature map for training outputted from a (1_k)-th convolutional neural network and (i–2) generate a (1_1)-st feature vector for training to a (1_n)-th feature vector for training as a result of applying fully-connected operation to the (1_k)-th updated feature map for training, and (ii) a (2_k)-th long short-term memory model to (ii–1) generate a (2_k)-th updated feature map for training as a result of updating the (2_k)-th feature map for training by referring to both a {2_(k–1)}-th updated feature map for training outputted from a {2_(k–1)}-th long short-term memory model and the (2_k)-th feature map for training outputted from the (2_k)-th convolutional neural network and (ii–2) generate a (2_1)-st feature vector for training to a (2_n)-th feature vector for training as a result of applying fully-connected operation to the (2_k)-th updated feature map for training. Thereafter, the learning device may have performed a process of inputting the (1_1)-st feature vector for training to the (1_n)-th feature vector for training and the (2_1)-st feature vector for training to the (2_n)-th feature vector for training into the attention layer, to thereby allow the attention layer to generate the autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training, a process of allowing the loss layer to calculate one or more losses by referring to the autonomous-driving mode value for training and its corresponding ground truth, and a process of learning the (1_1)-st long short-term memory model to the (1_n)-th long short-term memory model and the (2_1)-st long short-term memory model to the (2_n)-th long short-term memory model such that the losses are minimized by backpropagation using the losses.

On condition that the recurrent neural network has been learned as such, while the autonomous vehicle for testing is being driven, if a front video for testing and a rear video for testing are acquired respectively from a front camera for testing of an autonomous vehicle for testing and a rear camera for testing of the autonomous vehicle for testing, the testing device 200 may acquire a 1-st test image and a 2-nd test image respectively corresponding to a current frame of the front video for testing and a current frame of the rear video for testing. Herein, the 1-st test image and the 2-nd test image may be test images at the current point of time, generated by sampling each of videos taken by the front camera for testing and the rear camera for testing on the autonomous vehicle for testing at the preset time intervals, e.g., an image per second.

Figure 6:
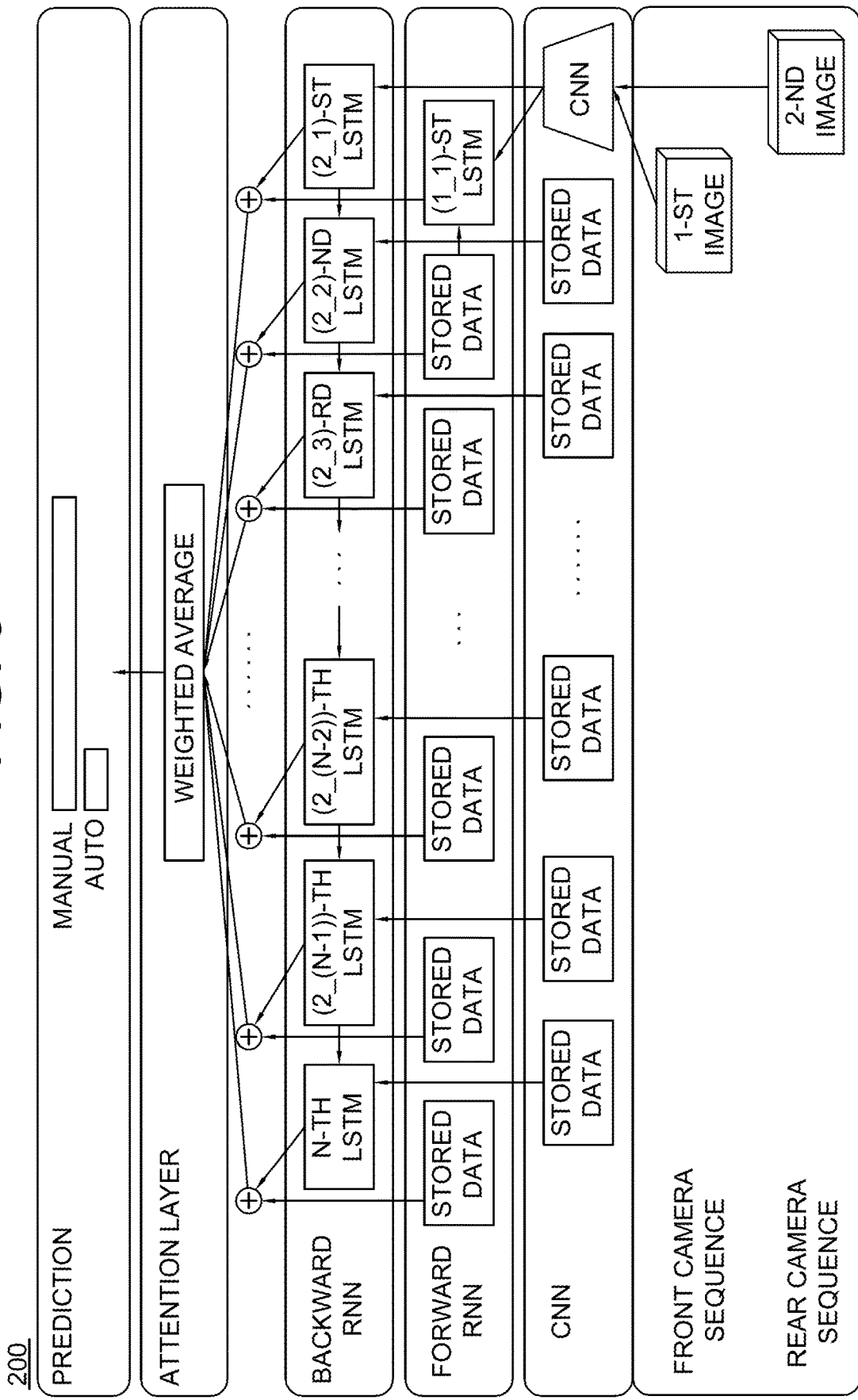
FIG. 6 is a drawing schematically illustrating a testing method for the recurrent neural network used for checking the autonomous driving safety to switch between the autonomous driving mode and the manual driving mode in accordance with one example embodiment of the present disclosure.

Next, by referring to FIG. 6, the testing device 200 may input the pair of the 1-st test image and the 2-nd test image into the 1-st CNN, and may instruct the 1-st CNN to output at least one 1-st feature map for testing generated by applying convolution operation to a concatenation of the 1-st test image and the 2-nd test image.

Herein, the 1-st CNN to the n-th CNN are used in the learning method shown in FIG. 2, however, because in the testing process, previous feature maps for testing, i.e., the 2-nd feature map for testing to the n-th feature map for testing, generated by using previous frames, i.e., previous sampled images corresponding to the 1-st image and the 2-nd image, have already been stored, the testing process may be performed by using a single CNN corresponding to the current point of time.

Also, the testing device 200 may perform a process of allowing the 1-st CNN to (i) concatenate the 1-st test image and the 2-nd test image, to thereby generate a 1-st concatenated test image and (ii) apply convolution operation to the 1-st concatenated test image, to thereby generate the 1-st feature map for testing.

Next, the testing device 200 may input the 1-st feature map for testing into the (1_1)-st long short-term memory model, to thereby allow the (1_1)-st long short-term memory model to generate a (1_1)-st updated feature map for testing as a result of updating the 1-st feature map for testing by referring to both (i) the (1_2)-nd updated feature map for testing created from the previous frame and (ii) the 1-st feature map for testing, and may generate a (1_1)-st feature vector for testing by applying fully-connected operation to the (1_1)-st updated feature map for testing.

That is, the testing device 200 may perform a process of allowing the (1_1)-st long short-term memory model to generate the (1_1)-st feature vector for testing by referring to the (1_2)-nd updated feature map for testing and the 1-st feature map for testing, where the (1_1)-st feature vector for testing corresponds to features to be used for determining whether a driving environment for testing represents the hazardous situation by referring to a pair of the 1-st test image and the 2-nd test image.

Also, the testing device 200 may input the 1-st feature map for testing into the (2_1)-st long short-term memory model, to thereby allow the (2_1)-st long short-term memory model to generate a (2_1)-st updated feature map for testing as a result of updating the 1-st feature map for testing by referring to the 1-st feature map for testing outputted from the 1-st CNN, and thus to output a (2_1)-st feature vector for testing by applying fully-connected operation to the (2_1)-st updated feature map for testing and may allow a (2_m)-th long short-term memory model to generate a (2_m)-th updated feature map for testing as result of updating an m-th feature map for testing by referring to both a {2_(m−1)}-th updated feature map for testing created by a {2_(m−1)}-th long short-term memory model and the m-th feature map for testing created from the previous frames by the 1-st CNN and thus to output a (2_2)-nd feature vector for testing to a (2_n)-th feature vector for testing by applying fully-connected operation to the (2_m)-th updated feature map for testing. Herein, m may be an integer larger than 1 and equal to or less than n.

That is, the testing device 200 may perform (i) a process of allowing the (2_1)-st long short-term memory model to generate the (2_1)-st feature vector for testing by referring to the (2_1)-st updated feature map for testing, where the (2_1)-st feature vector for testing corresponds to features to be used for determining whether the driving environment for testing represents the hazardous situation by referring to the pair of the 1-st test image and the 2-nd test image, and (ii) a process of allowing the (2_m)-th long short-term memory model to generate the (2_2)-nd feature vector for testing to the (2_n)-th feature vector for testing by referring to the {2_(m−1)}-th updated feature map for testing and the m-th feature map for testing, where the (2_2)-nd feature vector for testing to the (2_n)-th feature vector for testing correspond to features to be used for determining whether the driving environment for testing represents the hazardous situation by referring to the pair of the 1-st test image and the 2-nd test image.

Herein, the (1_1)-st LSTM to the (1_n)-th LSTM are used in the learning method shown in FIG. 2, however, because in the testing process, previous feature vectors for testing generated by the (1_1)-st LSTM using the previous frames, that is, previous feature vectors for testing, have already been stored, the testing process may be performed by using the single (1_1)-st LSTM corresponding to the current point of time.

Next, the testing device 200 may input into the attention layer (i) a (1_1)-st feature vector for testing, (ii) a (1_2)-nd feature vector for testing to a (1_n)-th feature vector for testing and a (2_1)-st feature vector for testing to a (2_m)-th feature vector for testing outputted by the (1_1)-st long short-term memory model from the previous frames, to thereby allow the attention layer to output an autonomous-driving mode value for testing for the 1-st test image and the 2-nd test image, that is, a value for confirming whether the autonomous vehicle is to be in the autonomous driving mode or in the manual driving mode by referring to the (1_1)-st feature vector for testing to the (1_n)-th feature vector for testing and the (2_1)-st feature vector for testing to the (2_m)-th feature vector for testing.

Herein, the testing device 200 may perform a process of allowing the attention layer to (i) concatenate a (1_k)-th feature vector for testing and a (2_k)-th feature vector for testing, to thereby generate a 1-st concatenated feature vector for testing to an n-th concatenated feature vector for testing and (ii) weight-average the 1-st concatenated feature vector for testing to the n-th concatenated feature vector for testing, to thereby generate the autonomous-driving mode value for testing.

As described above, the present disclosure relates to the method for fusing pieces of multiple view information acquired from the front camera and the rear camera on the autonomous vehicle, and instructing the recurrent neural network to determine whether the driving environment represents the hazardous situation and to check the autonomous driving safety, to thereby switch the driving mode of the autonomous vehicle accordingly.

The present disclosure has an effect of preventing increase in manufacturing cost of the autonomous vehicle, compared to conventional methods where various sensors are used, by analyzing integrated multiple camera information, recognizing the hazardous situation and checking the autonomous driving safety to switch between the autonomous driving mode and the manual driving mode, by using the recurrent neural network.

The present disclosure has another effect of minimizing the number of the sensors, compared to the conventional methods, by analyzing the integrated multiple camera information, recognizing the hazardous situation and checking the autonomous driving safety to switch between the autonomous driving mode and the manual driving mode, by using the recurrent neural network.

The present disclosure has still another effect of switching the driving mode of the autonomous vehicle with less computing resources, compared to the conventional methods, because only the integrated multiple camera information is processed, by analyzing the integrated multiple camera information, recognizing the hazardous situation and checking the autonomous driving safety to switch between the autonomous driving mode and the manual driving mode, by using the recurrent neural network.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning a recurrent neural network to check an autonomous driving safety to be used for switching a driving mode of an autonomous vehicle, comprising steps of:

(a) if a (1_1)-st training image to a (1_n)-th training image and a (2_1)-st training image to a (2_n)-th training image, which are sequence images respectively corresponding to a front camera for training and a rear camera for training of an autonomous vehicle for training, are acquired, a learning device performing a process of inputting each pair comprised of a (1_k)-th training image and a (2_k)-th training image, wherein an integer k represents sequences starting from n to 1, respectively into a 1-st convolutional neural network to an n-th convolutional neural network corresponding to a sequence of said each pair, to thereby allow a k-th convolutional neural network to concatenate the (1_k)-th training image and the (2_k)-th training image and thus to generate a 1-st feature map for training to an n-th feature map for training by applying convolution operation to a concatenation of the (1_k)-th training image and the (2_k)-th training image;

(b) the learning device performing (i) a process of inputting the 1-st feature map for training to the n-th feature map for training respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (i–1) a (1_k)-th long short-term memory model to (i–1-a) generate a (1_k)-th updated feature map for training as a result of updating the k-th feature map for training by referring to both a {1_(k+1)}-th updated feature map for training outputted from a {1_(k+1)}-th long short-term memory model and a k-th feature map for training outputted from a k-th convolutional neural network and (i–1-b) generate a (1_1)-st feature vector for training to a (1_n)-th feature vector for training as a result of applying fully-connected operation to the (1_k)-th updated feature map for training, and (i–2) a (2_k)-th long short-term memory model to (i–2-a) generate a (2_k)-th updated feature map for training as a result of updating the k-th feature map for training by referring to both a {2_(k–1)}-th updated feature map for training outputted from a {2_(k–1)}-th long short-term memory model and the k-th feature map for training outputted from the k-th convolutional neural network and (i–2-b) generate a (2_1)-st feature vector for training to a (2_n)-th feature vector for training as a result of applying fully-connected operation to the (2_k)-th updated feature map for training, and (ii) a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training; and (c) the learning device performing a process of allowing a loss layer to calculate one or more losses by referring to the autonomous-driving mode value for training and its corresponding ground truth, and a process of learning the (1_1)-st long short-term memory model to the (1_n)-th long short-term memory model and the (2_1)-st long short-term memory model to the (2_n)-th long short-term memory model such that the losses are minimized by backpropagation using the losses.

2. The method of claim 1, wherein, at the step of (b), the learning device performs a process of allowing the attention layer to (i) concatenate a (1_k)-th feature vector for training and a (2_k)-th feature vector for training, to thereby generate a 1-st concatenated feature vector for training to an n-th concatenated feature vector for training and (ii) weight-average the 1-st concatenated feature vector for training to the n-th concatenated feature vector for training, to thereby generate the autonomous-driving mode value for training.

3. The method of claim 1, wherein, at the step of (a), the learning device performs a process of allowing the 1-st convolutional neural network to the n-th convolutional neural network to (i) respectively concatenate the (1_k)-th training image and the (2_k)-th training image, to thereby generate a k-th concatenated training image and (ii) apply convolution operation to the k-th concatenated training image, to thereby generate the 1-st feature map for training to the n-th feature map for training.

4. The method of claim 1, wherein, at the step of (b), the learning device performs (i) a process of allowing the (1_k)-th long short-term memory model to generate the (1_1)-st feature vector for training to the (1_n)-th feature vector for training by referring to the {1_(k+1)}-th updated feature map for training and the (1_k)-th feature map for training, wherein the (1_1)-st feature vector for training to the (1_n)-th feature vector for training correspond to features to be used for determining whether driving environment for training represents a hazardous situation by referring to said pair of the (1_k)-th training image and the (2_k)-th training image, and (ii) a process of allowing the (2_k)-th long short-term memory model to generate the (2_1)-st feature vector for training to the (2_n)-th feature vector for training by referring to the {2_(k–1)}-th updated feature map for training and the (2_k)-th feature map for training, wherein the (2_1)-st feature vector for training to the (2_n)-th feature vector for training correspond to features to be used for determining whether the driving environment for training represents the hazardous situation by referring to said pair of the (1_k)-th training image and the (2_k)-th training image.

5. The method of claim 1, wherein, at the step of (c), the learning device performs a process of allowing the loss layer to normalize the autonomous-driving mode value for training by using a softmax algorithm, and a process of calculating the losses by referring to the normalized autonomous-driving mode value for training and the ground truth.

6. The method of claim 1, wherein the (1_1)-st training image to the (1_n)-th training image and the (2_1)-st training image to the (2_n)-th training image are generated by (i) (i–1) a process of sampling a video taken by the front camera for training of the autonomous vehicle for training per preset time intervals to thereby extract 1-st sequence images and (i–2) a process of labeling each of the extracted 1-st sequence images as to whether autonomous driving is possible, and (ii) (ii–1) a process of sampling a video taken by the rear camera for training of the autonomous vehicle for training per the preset time intervals to extract 2-nd sequence images and (ii–2) a process of labeling each of the extracted 2-nd sequence images as to whether the autonomous driving is possible.

7. The method of claim 1, wherein, at the step of (c), the ground truth is acquired from a 1-st next sequence image corresponding to a next sequence of the (1_1)-st training image to the (1_n)-th training image and a 2-nd next sequence image corresponding to the next sequence of the (2_1)-st training image to the (2_n)-th training image, among the sequence images.

8. A method for testing a recurrent neural network to check an autonomous driving safety to be used for switching a driving mode of an autonomous vehicle, comprising steps of:

(a) on condition that a learning device has performed, if a (1_1)-st training image to a (1_n)-th training image and a (2_1)-st training image to a (2_n)-th training image, which are sequence images respectively corresponding to a front camera for training and a rear camera for training of an autonomous vehicle for training, are acquired, (i) a process of inputting each pair comprised of a (1_k)-th training image and a (2_k)-th training image, wherein an integer k represents sequences starting from n to 1, respectively into a 1-st convolutional neural network to an n-th convolutional neural network corresponding to a sequence of said each pair, to thereby allow a k-th convolutional neural network to concatenate the (1_k)-th training image and the (2_k)-th training image and thus to generate a 1-st feature map for training to an n-th feature map for training by applying convolution operation to a concatenation of the (1_k)-th training image and the (2_k)-th training image, (ii) a process of inputting the 1-st feature map for training to the n-th feature map for training respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (ii–1) a (1_k)-th long short-term memory model to (ii–1-a) generate a (1_k)-th updated feature map for training as a result of updating the k-th feature map for training by referring to both a {1_(k+1)}-th updated feature map for training outputted from a {1_(k+1)}-th long short-term memory model and a k-th feature map for training outputted from a k-th convolutional neural network and (ii–1-b) generate a (1_1)-st feature vector for training to a (1_n)-th feature vector for training as a result of applying fully-connected operation to the (1_k)-th updated feature map for training, and (ii–2) a (2_k)-th long short-term memory model to (ii–2-a) generate a (2_k)-th updated feature map for training as a result of updating the k-th feature map for training by referring to both a {2_(k–1)}-th updated feature map for training outputted from a {2_(k–1)}-th long short-term memory model and the k-th feature map for training outputted from the k-th convolutional neural network and (ii–2-b) generate a (2_1)-st feature vector for training to a (2_n)-th feature vector for training as a result of applying fully-connected operation to the (2_k)-th updated feature map for training, (iii) a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training and (iv) a process of allowing a loss layer to calculate one or more losses by referring to the autonomous-driving mode value for training and its corresponding ground truth and a process of learning the (1_1)-st long short-term memory model to the (1_n)-th long short-term memory model and the (2_1)-st long short-term memory model to the (2_n)-th long short-term memory model such that the losses are minimized by backpropagation using the losses, if a front video for testing and a rear video for testing of an autonomous vehicle for testing are acquired respectively from a front camera for testing and a rear camera for testing of the autonomous vehicle for testing in operation, a testing device performing a process of inputting a 1-st test image corresponding to a current frame of the front video for testing and a 2-nd test image corresponding to a current frame of the rear video for testing into the 1-st convolutional neural network, to thereby allow the 1-st convolutional neural network to generate a 1-st feature map for testing by applying convolution operation to a concatenation of the 1-st test image and the 2-nd test image; and (b) the testing device performing (i) a process of inputting the 1-st feature map for testing to the n-th feature map for testing respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (i–1) a (1_k)-th long short-term memory model to (i–1-a) generate a (1_k)-th updated feature map for testing as a result of updating the k-th feature map for testing by referring to both a {1_(k+1)}-th updated feature map for testing outputted from a {1_(k+1)}-th long short-term memory model and a k-th feature map for testing outputted from a k-th convolutional neural network and (i–1-b) generate a (1_1)-st feature vector for testing to a (1_n)-th feature vector for testing as a result of applying fully-connected operation to the (1_k)-th updated feature map for testing, and (i–2) a (2_k)-th long short-term memory model to (i–2-a) generate a (2_k)-th updated feature map for testing as a result of updating the k-th feature map for testing by referring to both a {2_(k–1)}-th updated feature map for testing outputted from a {2_(k–1)}-th long short-term memory model and the k-th feature map for testing outputted from the k-th convolutional neural network and (i–2-b) generate a (2_1)-st feature vector for testing to a (2_n)-th feature vector for testing as a result of applying fully-connected operation to the (2_k)-th updated feature map for testing, and (ii) a process of inputting the (1_1)-st feature vector for testing to the (1_n)-th feature vector for testing and the (2_1)-st feature vector for testing to the (2_n)-th feature vector for testing into an attention layer, to thereby allow the attention layer to generate an autonomous-driving mode value for testing in every sequence of the (1_1)-st test image to the (1_n)-th test image and the (2_1)-st test image to the (2_n)-th test image by referring to the (1_1)-st feature vector for testing to the (1_n)-th feature vector for testing and the (2_1)-st feature vector for testing to the (2_n)-th feature vector for testing.

9. The method of claim 8, wherein, at the step of (b), the testing device performs a process of allowing the attention layer to (i) concatenate a (1_k)-th feature vector for testing and a (2_k)-th feature vector for testing, to thereby generate a 1-st concatenated feature vector for testing to an n-th concatenated feature vector for testing and (ii) weight-average the 1-st concatenated feature vector for testing to the n-th concatenated feature vector for testing, to thereby generate the autonomous-driving mode value for testing.

10. The method of claim 8, wherein, at the step of (a), the testing device performs a process of allowing the 1-st convolutional neural network to (i) concatenate the 1-st test image and the 2-nd test image, to thereby generate a 1-st concatenated test image and (ii) apply convolution operation to the 1-st concatenated test image, to thereby generate the 1-st feature map for testing.

11. The method of claim 8, wherein, at the step of (b), the testing device performs (i) a process of allowing the (1_1)-st long short-term memory model to generate the (1_1)-st feature vector for testing by referring to the (1_2)-nd updated feature map for testing and the 1-st feature map for testing, wherein the (1_1)-st feature vector for testing corresponds to features to be used for determining whether driving environment for testing represents a hazardous situation by referring to a pair of the 1-st test image and the 2-nd test image, (ii) a process of allowing the (2_1)-st long short-term memory model to generate the (2_1)-st feature vector for testing by referring to the (2_1)-st updated feature map for testing, wherein the (2_1)-st feature vector for testing corresponds to features to be used for determining whether the driving environment for testing represents the hazardous situation by referring to said pair of the 1-st test image and the 2-nd test image and (iii) a process of allowing the (2_m)-th long short-term memory model to generate the (2_2)-nd feature vector for testing to the (2_n)-th feature vector for testing by referring to the {2_(m_1)}-th updated feature map for testing and an m-th feature map for testing, wherein the (2_2)-nd feature vector for testing to the (2_n)-th feature vector for testing correspond to features to be used for determining whether the driving environment for testing represents the hazardous situation by referring to said pair of the 1-st test image and the 2-nd test image.

12. A learning device for learning a recurrent neural network to check an autonomous driving safety to be used for switching a driving mode of an autonomous vehicle, comprising:
at least one memory that stores instructions; and
at least one processor configured to execute the instructions to perform or support another device to perform: (I) if a (1_1)-st training image to a (1_n)-th training image and a (2_1)-st training image to a (2_n)-th training image, which are sequence images respectively corresponding to a front camera for training and a rear camera for training of an autonomous vehicle for training, are acquired, a process of inputting each pair comprised of a (1_k)-th training image and a (2_k)-th training image, wherein an integer k represents sequences starting from n to 1, respectively into a 1-st convolutional neural network to an n-th convolutional neural network corresponding to a sequence of said each pair, to thereby allow a k-th convolutional neural network to concatenate the (1_k)-th training image and the (2_k)-th training image and thus to generate a 1-st feature map for training to an n-th feature map for training by applying convolution operation to a concatenation of the (1_k)-th training image and the (2_k)-th training image, (II) (i) a process of inputting the 1-st feature map for training to the n-th feature map for training respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (i-1) a (1_k)-th long short-term memory model to (i-1-a) generate a (1_k)-th updated feature map for training as a result of updating the k-th feature map for training by referring to both a {1_(k+1)}-th updated feature map for training outputted from a {1_(k+1)}-th long short-term memory model and a k-th feature map for training outputted from a k-th convolutional neural network and (i-1-b) generate a (1_1)-st feature vector for training to a (1_n)-th feature vector for training as a result of applying fully-connected operation to the (1_k)-th updated feature map for training, and (i-2) a (2_k)-th long short-term memory model to (i-2-a) generate a (2_k)-th updated feature map for training as a result of updating the k-th feature map for training by referring to both a {2_(k−1)}-th updated feature map for training outputted from a {2_(k−1)}-th long short-term memory model and the k-th feature map for training outputted from the k-th convolutional neural network and (i-2-b) generate a (2_1)-st feature vector for training to a (2_n)-th feature vector for training as a result of applying fully-connected operation to the (2_k)-th updated feature map for training, and (ii) a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training, and (III) a process of allowing a loss layer to calculate one or more losses by referring to the autonomous-driving mode value for training and its corresponding ground truth, and a process of learning the (1_1)-st long short-term memory model to the (1_n)-th long short-term memory model and the (2_1)-st long short-term memory model to the (2_n)-th long short-term memory model such that the losses are minimized by backpropagation using the losses.

13. The learning device of claim 12, wherein, at the process of (II), the processor performs a process of allowing the attention layer to (i) concatenate a (1_k)-th feature vector for training and a (2_k)-th feature vector for training, to thereby generate a 1-st concatenated feature vector for training to an n-th concatenated feature vector for training and (ii) weight-average the 1-st concatenated feature vector for training to the n-th concatenated feature vector for training, to thereby generate the autonomous-driving mode value for training.

14. The learning device of claim 12, wherein, at the process of (I), the processor performs a process of allowing the 1-st convolutional neural network to the n-th convolutional neural network to (i) respectively concatenate the (1_k)-th training image and the (2_k)-th training image, to thereby generate a k-th concatenated training image and (ii) apply convolution operation to the k-th concatenated training image, to thereby generate the 1-st feature map for training to the n-th feature map for training.

15. The learning device of claim 12, wherein, at the process of (II), the processor performs (i) a process of allowing the (1_k)-th long short-term memory model to generate the (1_1)-st feature vector for training to the (1_n)-th feature vector for training by referring to the {1_(k+1)}-th updated feature map for training and the (1_k)-th feature map for training, wherein the (1_1)-st feature vector for training to the (1_n)-th feature vector for training correspond to features to be used for determining whether driving environment for training represents a hazardous situation by referring to said pair of the (1_k)-th training image and the (2_k)-th training image, and (ii) a process of allowing the (2_k)-th long short-term memory model to generate the (2_1)-st feature vector for training to the (2_n)-th feature vector for training by referring to the {2_(k−1)}-th updated feature map for training and the (2_k)-th feature map for training, wherein the (2_1)-st feature vector for training to the (2_n)-th feature vector for training correspond to features to be used for determining whether the driving environment for training represents the hazardous situation by referring to said pair of the (1_k)-th training image and the (2_k)-th training image.

16. The learning device of claim 12, wherein, at the process of (III), the processor performs a process of allowing the loss layer to normalize the autonomous-driving mode value for training by using a softmax algorithm, and a process of calculating the losses by referring to the normalized autonomous-driving mode value for training and the ground truth.

17. The learning device of claim 12, wherein the (1_1)-st training image to the (1_n)-th training image and the (2_1)-st training image to the (2_n)-th training image are generated by (i) (i–1) a process of sampling a video taken by the front camera for training of the autonomous vehicle for training per preset time intervals to thereby extract 1-st sequence images and (i–2) a process of labeling each of the extracted 1-st sequence images as to whether autonomous driving is possible, and (ii) (ii–1) a process of sampling a video taken by the rear camera for training of the autonomous vehicle for training per the preset time intervals to extract 2-nd sequence images and (ii–2) a process of labeling each of the extracted 2-nd sequence images as to whether the autonomous driving is possible.

18. The learning device of claim 12, wherein, at the process of (III), the ground truth is acquired from a 1-st next sequence image corresponding to a next sequence of the (1_1)-st training image to the (1_n)-th training image and a 2-nd next sequence image corresponding to the next sequence of the (2_1)-st training image to the (2_n)-th training image, among the sequence images.

19. A testing device for testing a recurrent neural network to check an autonomous driving safety to be used for switching a driving mode of an autonomous vehicle, comprising:
at least one memory that stores instructions; and
at least one processor configured to execute the instructions to perform or support another device to perform: (I) on condition that a learning device has performed, if a (1_1)-st training image to a (1_n)-th training image and a (2_1)-st training image to a (2_n)-th training image, which are sequence images respectively corresponding to a front camera for training and a rear camera for training of an autonomous vehicle for training, are acquired, (i) a process of inputting each pair comprised of a (1_k)-th training image and a (2_k)-th training image, wherein an integer k represents sequences starting from n to 1, respectively into a 1-st convolutional neural network to an n-th convolutional neural network corresponding to a sequence of said each pair, to thereby allow a k-th convolutional neural network to concatenate the (1_k)-th training image and the (2_k)-th training image and thus to generate a 1-st feature map for training to an n-th feature map for training by applying convolution operation to a concatenation of the (1_k)-th training image and the (2_k)-th training image, (ii) a process of inputting the 1-st feature map for training to the n-th feature map for training respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (ii–1) a (1_k)-th long short-term memory model to (ii–1-a) generate a (1_k)-th updated feature map for training as a result of updating the k-th feature map for training by referring to both a {1_(k+1)}-th updated feature map for training outputted from a {1_(k+1)}-th long short-term memory model and a k-th feature map for training outputted from a k-th convolutional neural network and (ii–1-b) generate a (1_1)-st feature vector for training to a (1_n)-th feature vector for training as a result of applying fully-connected operation to the (1_k)-th updated feature map for training, and (ii–2) a (2_k)-th long short-term memory model to (ii–2-a) generate a (2_k)-th updated feature map for training as a result of updating the k-th feature map for training by referring to both a {2_(k–1)}-th updated feature map for training outputted from a {2_(k–1)}-th long short-term memory model and the k-th feature map for training outputted from the k-th convolutional neural network and (ii–2-b) generate a (2_1)-st feature vector for training to a (2_n)-th feature vector for training as a result of applying fully-connected operation to the (2_k)-th updated feature map for training, (iii) a process of inputting the (1_1)-st feature vector for training to the (1_n)-th feature vector for training and the (2_1)-st feature vector for training to the (2_n)-th feature vector for training into an attention layer, to thereby allow the attention layer to generate an autonomous-driving mode value for training in every sequence of the (1_1)-st training image to the (1_n)-th training image and the (2_1)-st training image to the (2_n)-th training image by referring to the (1_1)-st feature vector for training to the (1_n)-th feature vector for training and the (2_1)-st feature vector for training to the (2_n)-th feature vector for training and (iv) a process of allowing a loss layer to calculate one or more losses by referring to the autonomous-driving mode value for training and its corresponding ground truth and a process of learning the (1_1)-st long short-term memory model to the (1_n)-th long short-term memory model and the (2_1)-st long short-term memory model to the (2_n)-th long short-term memory model such that the losses are minimized by backpropagation using the losses, if a front video for testing and a rear video for testing of an autonomous vehicle for testing are acquired respectively from a front camera for testing and a rear camera for testing of the autonomous vehicle for testing in operation, a process of inputting a 1-st test image corresponding to a current frame of the front video for testing and a 2-nd test image corresponding to a current frame of the rear video for testing into the 1-st convolutional neural network, to thereby allow the 1-st convolutional neural network to generate a 1-st feature map for testing by applying convolution operation to a concatenation of the 1-st test image and the 2-nd test image, and (II) (i) a process of inputting the 1-st feature map for testing to the n-th feature map for testing respectively into a (1_1)-st long short-term memory model to a (1_n)-th long short-term memory model corresponding to each of sequences of a forward recurrent neural network, and respectively into a (2_1)-st long short-term memory model to a (2_n)-th long short-term memory model corresponding to each of the sequences of a backward recurrent neural network, to thereby allow (i–1) a (1_k)-th long short-term memory model to (i–1-a) generate a (1_k)-th updated feature map for testing as a result of updating the k-th feature map for testing by referring to both a {1_(k+1)}-th updated feature map for testing outputted from a {1_(k+1)}-th long short-term memory model and a k-th feature map for testing outputted from a k-th convolutional neural network and (i–1-b) generate a (1_1)-st feature vector for testing to a (1_n)-th feature vector for testing as a result of applying fully-connected operation to the (1_k)-th updated feature map for testing, and (i–2) a (2_k)-th long short-term memory model to (i-2-a) generate a (2_k)-th updated feature map for testing as a result of updating the k-th feature map for testing by referring to both a {2_(k–1)}-th updated feature map for testing outputted from a {2_(k–1)}-th long short-term memory model and the k-th feature map for testing outputted from the k-th convolutional neural network and (i-2-b) generate a (2_1)-st feature vector for testing to a (2_n)-th feature vector for testing as a result of applying fully-connected operation to the (2_k)-th updated feature map for testing, and (ii) a process of inputting the (1_1)-st feature vector for testing to the (1_n)-th feature vector for testing and the (2_1)-st feature vector for testing to the (2_n)-th feature vector for testing into an attention layer, to thereby allow the attention layer to generate an autonomous-driving mode value for testing in every sequence of the (1_1)-st test image to the (1_n)-th test image and the (2_1)-st test image to the (2_n)-th test image by referring to the (1_1)-st feature vector for testing to the (1_n)-th feature vector for testing and the (2_1)-st feature vector for testing to the (2_n)-th feature vector for testing.

20. The testing device of claim 19, wherein, at the process of (II), the processor performs a process of allowing the attention layer to (i) concatenate a (1_k)-th feature vector for testing and a (2_k)-th feature vector for testing, to thereby generate a 1-st concatenated feature vector for testing to an n-th concatenated feature vector for testing and (ii) weight-average the 1-st concatenated feature vector for testing to the n-th concatenated feature vector for testing, to thereby generate the autonomous-driving mode value for testing.

21. The testing device of claim 19, wherein, at the process of (I), the processor performs a process of allowing the 1-st convolutional neural network to (i) concatenate the 1-st test image and the 2-nd test image, to thereby generate a 1-st concatenated test image and (ii) apply convolution operation to the 1-st concatenated test image, to thereby generate the 1-st feature map for testing.

22. The testing device of claim 19, wherein, at the process of (II), the processor performs (i) a process of allowing the (1_1)-st long short-term memory model to generate the (1_1)-st feature vector for testing by referring to the (1_2)-nd updated feature map for testing and the 1-st feature map for testing, wherein the (1_1)-st feature vector for testing corresponds to features to be used for determining whether driving environment for testing represents a hazardous situation by referring to a pair of the 1-st test image and the 2-nd test image, (ii) a process of allowing the (2_1)-st long short-term memory model to generate the (2_1)-st feature vector for testing by referring to the (2_1)-st updated feature map for testing, wherein the (2_1)-st feature vector for testing corresponds to features to be used for determining whether the driving environment for testing represents the hazardous situation by referring to said pair of the 1-st test image and the 2-nd test image and (iii) a process of allowing the (2_m)-th long short-term memory model to generate the (2_2)-nd feature vector for testing to the (2_n)-th feature vector for testing by referring to the {2_(m_1)}-th updated feature map for testing and an m-th feature map for testing, wherein the (2_2)-nd feature vector for testing to the (2_n)-th feature vector for testing correspond to features to be used for determining whether the driving environment for testing represents the hazardous situation by referring to said pair of the 1-st test image and the 2-nd test image.

* * * * *